A. M. AHERN.
JAW FOR ANIMAL TRAPS.
APPLICATION FILED DEC. 12, 1921.
1,428,512. Patented Sept. 12, 1922.
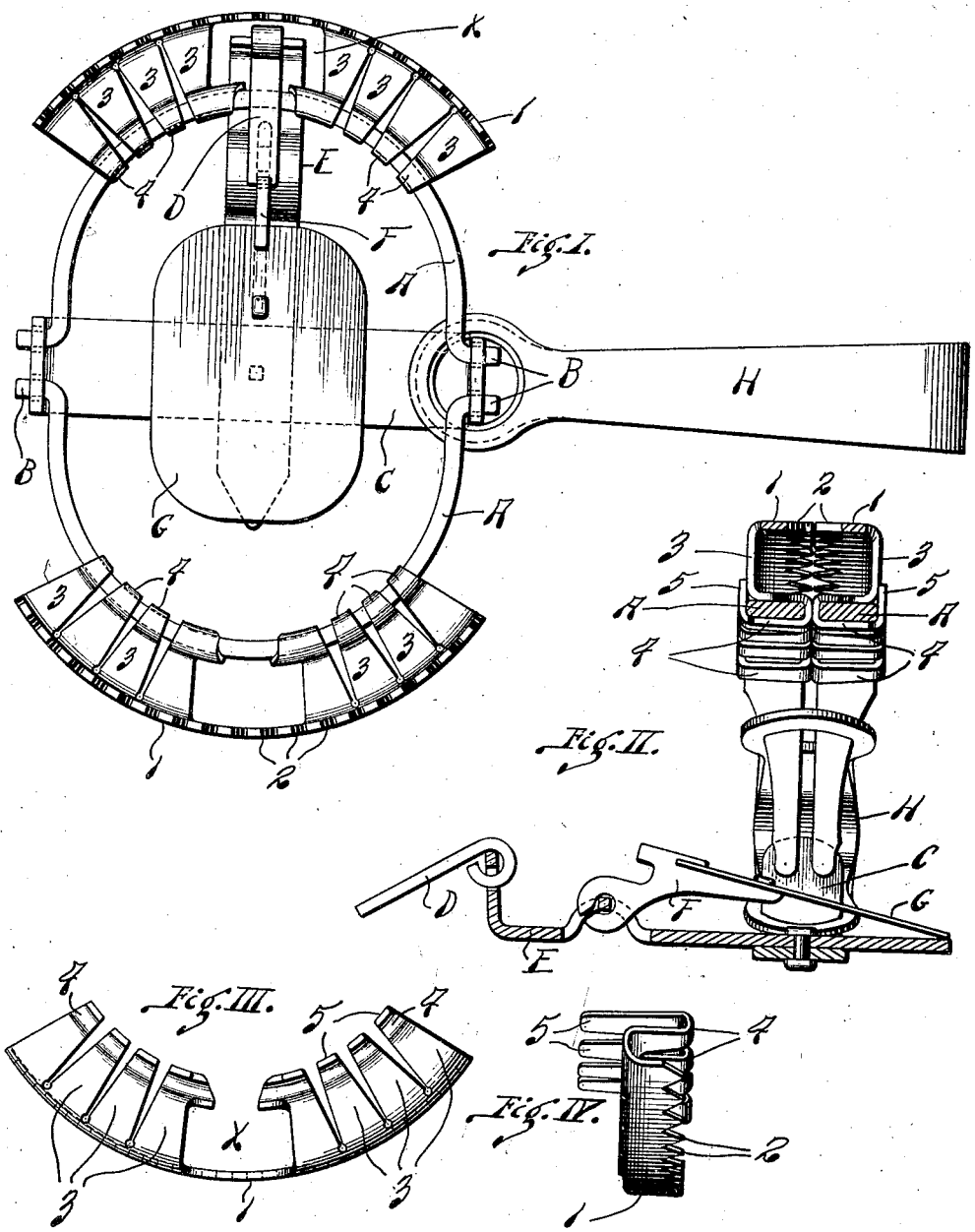
Inventor:
A. M. Ahern Patented Sept. 12, 1922.

1,428,512

UNITED STATES PATENT OFFICE.

ALBERT M. AHERN, OF ST. LOUIS, MISSOURI.

JAW FOR ANIMAL TRAPS.

Application filed December 12, 1921. Serial No. 521,630.

*To all whom it may concern:*

Be it known that I, ALBERT M. AHERN, a citizen of the United States of America, a resident of the city of St. Louis and State of Missouri, have invented certain new and useful Improvements in Jaws for Animal Traps, of which the following is a full, clear, and exact description, reference being had to the accompanying drawings, forming a part of this specification.

This invention relates to improvements in jaws for animal traps, and more particularly to an auxiliary jaw adapted to be attached to an ordinary animal trap of the type known as "steel traps."

The main object of the invention is to produce an attachment of this kind comprising an outer jaw provided with separating means whereby it is spaced from the ordinary jaw of the trap to which it is secured. Attachments of this kind increase the "spread" of the trap so as to provide a relatively large trapping area between the jaws. Moreover, the outer jaws grip the animal at the upper portion of the leg where the flesh can be more securely held by the jaws.

A further object is to provide double gripping jaws adapted to obtain a double grip on the leg of an animal. The outer jaw of my attachment preferably cooperates with the ordinary jaw of the trap to form a double jaw, and the attachment itself is preferably provided with flexible members embracing the ordinary trap jaw and cooperating therewith to form the inner gripping jaw.

With the foregoing and other objects in view, the invention comprises the novel construction, combination and arrangements of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a top view of a trap equipped with jaws embodying the features of this invention, the trap being shown in its open position.

Fig. II is a vertical section showing the trap in its closed position.

Fig. III is a side elevation of one of the new jaws.

Fig. IV is an end view of the jaw shown in Fig. III.

To illustrate one form of the invention, I have shown an auxiliary trap jaw made of a single piece of flexible sheet metal adapted to be easily and quickly attached to traps of different dimensions. 1 designates an outer jaw member in the form of a long, curved strip having gripping teeth 2 on one of its longitudinal edges. Separating members 3 extend inwardly from the other longitudinal edge of jaw 1. 4 designates a curved row of inner jaw members extending from the inner ends of separating members 3, said inner jaw members 4 being U-shaped as shown by Figs. II and IV, so as to embrace a rigid jaw A of an ordinary trap. Flexible attaching tongues 5 extend from the jaw members 4, and these tongues can be bent outwardly as shown by Fig. II, to secure the attachment to the trap. The jaw members 4 embrace one of the rigid jaws A and engage the inner edge thereof, and the tongues 5 can be readily bent to engage the outer edge of the rigid jaw.

It will now be understood that the double jaw having inner and outer jaw members 4 and 1, respectively, can be easily secured to a trap, and when secured as herein shown the double jaw is very rigid and non-yielding.

However, before the double jaw is applied to a trap it is flexible and can be readily bent to conform to trap jaws of different shapes and different dimensions. The outer jaw 1 is a thin strip of flexible metal, and the free extensions forming the members 3, 4 and 5 can be readily moved toward and away from each other to vary the curvature of the inner and outer jaw members.

In the preferred form of the invention, the inner jaw members 4 perform two functions. They aid in securing the attachment to a trap, and they preferably form gripping elements at the inner edge of a rigid jaw A.

The ordinary steel trap herein shown comprises a pair of the curved rigid jaws A, each having pivotal end extensions B passing through upturned ends of a base member C. A trippable jaw-holding finger D is pivoted to the upturned end of a base member E, and an ordinary trigger F is pivoted to this base member, as shown by Fig. II, said trigger being provided with a pan G which is depressed to release the trap. H designates the usual spring having apertures in its ends to receive one of the upturned ends of base member C, as shown by Fig. I.

When the trap is set as shown in Fig. I, the trippable jaw-holding finger D is interlocked with the trigger F in the usual manner, and said trippable finger overlies and engages one of the rigid jaws A. The double jaw should not interfere with the action of this ordinary tripping device, and the separating members 3 are therefore spaced apart to provide an opening X at a point midway between the ends of the double jaw. For the same reason, the inner jaw members 4 are separated from each other to expose a portion of rigid jaw A at a point midway between the ends of the attachment.

In setting the trap, the trippable jaw-holding finger D is inserted through the opening X and placed upon the exposed middle portion of the rigid jaw A, so the double jaw attachment does not in any way interfere with the tripping device. When the trap is set, the upturned end of base member E extends into the opening X.

I claim:

1. As a new article of manufacture, a flexible auxiliary trap-jaw comprising an outer jaw, flexible inner jaw members adapted to embrace the jaw of a trap, separating members extending inwardly from said outer jaw and formed integral with said inner jaw members, and flexible attaching tongues extending from said inner jaw members to secure the same to a trap.

2. As a new article of manufacture, a flexible auxiliary trap-jaw comprising a curved outer jaw member made of flexible sheet metal, a curved row of flexible inner jaw members, separating members extending from said outer jaw to said inner jaw members, and flexible attaching tongues extending from said inner jaw members to secure the same to a jaw of a trap, said separating members being movable toward and away from each other to vary the curvature of said jaw members.

3. As a new article of manufacture, a flexible auxiliary trap-jaw comprising a curved outer jaw member made of flexible sheet metal and provided with gripping teeth on one of its longitudinal edges, separating members extending from the other longitudinal edge of said outer jaw member, a curved row of inner jaw members extending from said separating members, and flexible attaching tongues to secure said auxiliary trap to the jaw of a trap-jaw, said attaching tongues being movable toward and away from each other to vary the curvature of said inner and outer jaw members.

4. In an attachment for an animal trap having a trippable jaw-holding member, a double jaw comprising inner and outer jaw members separated from each other to receive the trippable jaw-holding member, and means for securing said double jaw to the jaw of a trap.

5. In an attachment for an animal trap having a trippable jaw-holding member, a double jaw comprising an outer jaw member, an inner jaw member adapted to be secured to a jaw of a trap, and separating means whereby said inner jaw member is separated from said outer jaw member, said separating means being provided with an opening to receive said trippable jaw-holding member.

6. In an attachment for an animal trap having a rigid jaw and a trippable jaw-holding member adapted to engage said jaw, said attachment comprising a double jaw provided with a flexible outer jaw member, flexible inner jaw members, separating members extending from said outer jaw member to said inner jaw members, and flexible attaching members extending from said inner jaw members to secure the double jaw to said rigid jaw, said separating members being spaced from each other to receive the trippable jaw-holding member.

7. In an attachment for an animal trap having a rigid jaw and a trippable jaw-holding member adapted to engage said jaw, said attachment comprising a double jaw provided with a flexible outer jaw member, flexible inner jaw members, separating members extending from said outer jaw member to said inner jaw members, and flexible attaching members extending from said inner jaw members to secure the double jaw to said rigid jaw, said inner jaw members being separated from each other at a point substantially midway between the ends of the double jaw to provide a space for the trippable jaw-holding member.

8. In an attachment for an animal trap having a rigid jaw and a trippable jaw-holding member adapted to engage said jaw, said attachment comprising a double jaw provided with a flexible outer jaw member, flexible inner jaw members, separating members extending from said outer jaw member to said inner jaw members, and flexible attaching members extending from said inner jaw members to secure the double jaw to said rigid jaw, said inner jaw members being separated from each other at a point substantially midway between the ends of the double jaw to provide a space for the trippable jaw-holding member, and said separating members being spaced from each other to receive the trippable jaw-holding member.

In testimony that I claim the forgoing I hereunto affix my signature.

ALBERT M. AHERN.